US009778556B2

(12) United States Patent
Khromov et al.

(10) Patent No.: US 9,778,556 B2
(45) Date of Patent: Oct. 3, 2017

(54) IMAGING SYSTEM HAVING A POLARIZATION ELEMENT

(71) Applicant: Huawei Technologies Co., Ltd., Shenzhen (CN)

(72) Inventors: Maxim Khromov, Shenzhen (CN); Nikolay Petrov, Shenzhen (CN); Vladislav Nikitin, Shenzhen (CN); Qingpeng Xie, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 3 days.

(21) Appl. No.: 14/936,373

(22) Filed: Nov. 9, 2015

(65) Prior Publication Data

US 2016/0139498 A1 May 19, 2016

(30) Foreign Application Priority Data

Nov. 18, 2014 (CN) .......................... 2014 1 0657787

(51) Int. Cl.
*G02B 27/26* (2006.01)
*H04N 13/04* (2006.01)
(Continued)

(52) U.S. Cl.
CPC ......... *G03B 35/26* (2013.01); *G02B 27/2214* (2013.01); *G02B 27/26* (2013.01);
(Continued)

(58) Field of Classification Search
CPC .... G02B 27/2214; G02B 27/26; G03B 35/20; G03B 35/24; G03B 35/26; H04N 13/0404;
(Continued)

(56) References Cited

U.S. PATENT DOCUMENTS 5,537,144 A   7/1996   Faris
5,855,425 A *   1/1999   Hamagishi ......... G02B 27/2214
                                                  348/E13.029

(Continued)

FOREIGN PATENT DOCUMENTS

DE   102011122636 B3     3/2013
EP       2797328 A1     10/2014
(Continued)

*Primary Examiner* — Bao-Luan Le
(74) *Attorney, Agent, or Firm* — Leydig, Voit & Mayer, Ltd.

(57) ABSTRACT

Embodiments of the present invention provide an imaging system, including: a first polarization element having a first polarization direction; a second polarization element having a second polarization direction; a third polarization element, where the third polarization element has multiple areas that respectively correspond to multiple pixel positions, each area in the multiple areas consists of a first semi-area and a second semi-area; a first projection device, projecting an image onto the multiple areas by using the first polarization element and based on the multiple pixel positions; and a second projection device, projecting an image onto the multiple areas by using the second polarization element and based on the multiple pixel positions. In the embodiments of the present invention, images from multiple views may be presented, by using a polarization element, in areas corresponding to pixel positions, which, therefore, can improve imaging resolution.

11 Claims, 4 Drawing Sheets

(51) Int. Cl.
*G03B 35/26* (2006.01)
*G02B 27/22* (2006.01)
*G03B 35/20* (2006.01)
*G03B 35/24* (2006.01)

(52) U.S. Cl.
CPC ..... H04N 13/0404 (2013.01); H04N 13/0409 (2013.01); *G03B 35/20* (2013.01); *G03B 35/24* (2013.01)

(58) Field of Classification Search
CPC ........... H04N 13/0409; H04N 13/0406; H04N 13/0415; H04N 13/0429; H04N 13/0434
See application file for complete search history.

(56) References Cited

U.S. PATENT DOCUMENTS

| | | | | |
|---|---|---|---|---|
| 5,930,037 | A * | 7/1999 | Imai | G02B 27/2214 348/59 |
| 7,230,759 | B2 * | 6/2007 | Huang | G02B 27/225 348/57 |
| 8,248,457 | B2 * | 8/2012 | Goldstein | A61B 1/041 250/201.8 |
| 8,786,687 | B1 * | 7/2014 | Smith | G02B 27/2214 348/59 |
| 9,596,458 | B2 * | 3/2017 | Smith | G02B 27/2214 |
| 2005/0168815 | A1 | 8/2005 | Maruyama et al. | |
| 2006/0139751 | A1 | 6/2006 | Cha et al. | |
| 2007/0146845 | A1 * | 6/2007 | Hirabara | G02B 27/2264 359/23 |
| 2007/0279319 | A1 * | 12/2007 | Yamazaki | A63F 13/02 345/32 |
| 2011/0063575 | A1 * | 3/2011 | Nelson | H04N 13/0404 353/7 |
| 2011/0249093 | A1 * | 10/2011 | Yeh | G02B 5/201 348/46 |
| 2013/0188023 | A1 | 7/2013 | Kuang et al. | |
| 2013/0342664 | A1 * | 12/2013 | Smith | H04N 13/0402 348/58 |

FOREIGN PATENT DOCUMENTS

| | | |
|---|---|---|
| JP | H01164192 A | 6/1989 |
| JP | H01317091 A | 12/1989 |
| JP | H0418893 A | 1/1992 |
| JP | H09113862 A | 5/1997 |
| JP | 2008070851 A | 3/2008 |
| KR | 20130073799 A | 7/2013 |
| KR | 20140025784 A | 3/2014 |
| WO | WO 9521398 A1 | 8/1995 |

* cited by examiner

IMAGING SYSTEM HAVING A POLARIZATION ELEMENT

CROSS-REFERENCE TO RELATED APPLICATIONS

This application claims priority to Chinese Patent Application No. 201410657787.9, filed on Nov. 18, 2014, which is incorporated herein by reference in its entirety.

TECHNICAL FIELD

The present invention relates to the field of imaging, and in particular, to an imaging system.

BACKGROUND 3D display technologies may be classified into two main types, 3D display technologies with glasses and glasses-free 3D display technologies, where the 3D technologies with glasses may further be classified into an anaglyph 3D technology, a polarized 3D technology, and an active shutter 3D technology. The anaglyph 3D technology and the polarized 3D technology are mainly used by projection screens (movies or projectors), and the active shutter 3D technology is used in both 3D television and 3D movies.

Currently, glasses-free 3D display technologies used by manufacturers mainly include the following types: A parallax barrier 3D technology, has a principle similar to that of the polarized 3D technology. Parallax barrier 3D products are compatible with the existing LCD crystal process, and therefore, have advantages in productivity and costs. However, image resolution and luminance of products using such a technology are reduced. A method for implementing the parallax barrier 3D technology is to use a switch liquid crystal display screen, a polarization layer, and a polymer liquid crystal layer, and fabricate a series of vertical stripes in a direction of 90° by using the liquid crystal layer and the polarization layer. These stripes are tens of microns wide, and lights passing through these stripes form a mode of vertical thin gratings, which are referred to as "parallax barriers". This technology uses parallax barriers disposed between a backlight module and an LCD panel, so that in three-dimensional display mode, when an image that should be seen by a left eye is displayed on a liquid crystal display screen, opaque stripes shade a right eye; similarly, when an image that should be seen by the right eye is displayed on the liquid crystal display screen, the opaque stripes shade the left eye, and visual pictures of the left eye and the right eye are separated, so that a viewer sees 3D images.

A columnar lens technology is also referred to as a double-convex lens or micro-cylindrical lens 3D technology, and the greatest advantage thereof is that luminance is not affected. The principle of the columnar lens 3D technology is as follows: A layer of columnar lenses is added before a liquid crystal display screen, so that an image plane of the liquid crystal display screen is located on a focal plane of a lens; and in this way, a pixel of an image under each columnar lens is divided into several subpixels, so that the lens can project each subpixel in a different direction. Therefore, both eyes see different subpixels when viewing the display screen from different angles. However, spacings between the pixels are enlarged; therefore, subpixels cannot be simply superimposed. The columnar lens is made at an angle, instead of in parallel, to the pixel column. In this way, each group of subpixels is repeatedly projected onto a viewing area, rather than that only one group of parallax images is projected. Because the columnar lenses do not block the back light, picture luminance can be well ensured.

In the prior art, an imaging system is disclosed, which includes arrays of pixel positions with respective optical filters, where every two adjacent columns have alternately different polarization directions, and alternating polarization is generated by using the optical filters in the pixel positions of the adjacent columns. However, such an imaging system still cannot meet a requirement of a viewer for image resolution.

SUMMARY

Embodiments of the present invention provide an imaging system, which can improve imaging resolution.

According to a first aspect, an system is provided, including: a first polarization element having a first polarization direction;

a second polarization element having a second polarization direction, where the second polarization direction is different from the first polarization direction; a third polarization element, where a first area of the third polarization element consists of a first semi-area and a second semi-area, where the first semi-area of the first area has the first polarization direction, and the second semi-area of the first area has the second polarization direction; a first projection device, projecting a first image onto the first area by using the first polarization element; and a second projection device, projecting a second image onto the first area by using the second polarization element.

With reference to the first aspect, in a first possible implementation manner of the first aspect, the first image is obtained through acquiring according to a first view of a first object, the second image is obtained through acquiring according to a second view of the first object, and the first view is different from the second view.

With reference to the first possible implementation manner of the first aspect, in a second possible implementation manner of the first aspect, the second polarization element further includes a second area adjacent to the first area, where a first semi-area of the second area has the first polarization direction, and a second semi-area of the second area has the second polarization direction, where the first semi-area of the second area is adjacent to the first semi-area of the first area, or the second semi-area of the second area is adjacent to the second semi-area of the first area; the first projection device further projects a third image onto the second area by using the first polarization element, and the second projection device further projects a fourth image onto the second area by using the second polarization element, where the third image is acquired according to a third view of a second object, the fourth image is acquired according to a fourth view of the second object, and the third view is different from the fourth view.

With reference to the first or the second possible implementation manner of the first aspect, in a third possible implementation manner of the first aspect, the imaging system further includes: a columnar lens layer, where the third polarization element is disposed between the columnar lens layer and the first polarization element, or the third polarization element is disposed between the columnar lens layer and the second polarization element.

With reference to the first aspect, in a fourth possible implementation manner of the first aspect, the first image is obtained through acquiring according to a first view of a third object, the second image is obtained through acquiring according to a second view of the third object, and the first view is identical to the second view.

With reference to the first aspect and any one of the first to the fourth possible implementation manners of the first aspect, in a fifth possible implementation manner of the first aspect, the first polarization direction is perpendicular to the second polarization direction.

With reference to the first aspect and any one of the first to the fifth possible implementation manners of the first aspect, in a sixth possible implementation manner of the first aspect, the third polarization element is a polarization grating.

With reference to the first aspect and any one of the first to the sixth possible implementation manners of the first aspect, in a seventh possible implementation manner of the first aspect, the third polarization element is a switchable liquid crystal.

With reference to the first aspect and any one of the first to the seventh possible implementation manners of the first aspect, in an eighth possible implementation manner of the first aspect, the imaging system further includes: a scatter, where the third polarization element is disposed between the scatter and the first polarization element, or the third polarization element is disposed between the scatter and the second polarization element.

An imaging system according to the embodiments of the present invention includes multiple polarization elements and projection devices, and because the projection devices can present in an area, corresponding to a pixel position, of a polarization element, images from two views, imaging resolution can be improved.

BRIEF DESCRIPTION OF DRAWINGS

To describe the technical solutions in the embodiments of the present invention more clearly, the following briefly introduces the accompanying drawings required for describing the embodiments of the present invention. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are some rather than all of the embodiments of the present invention. All other embodiments obtained by a person of ordinary skill in the art based on the embodiments of the present invention without creative efforts shall fall within the protection scope of the present invention.

Figure 1:
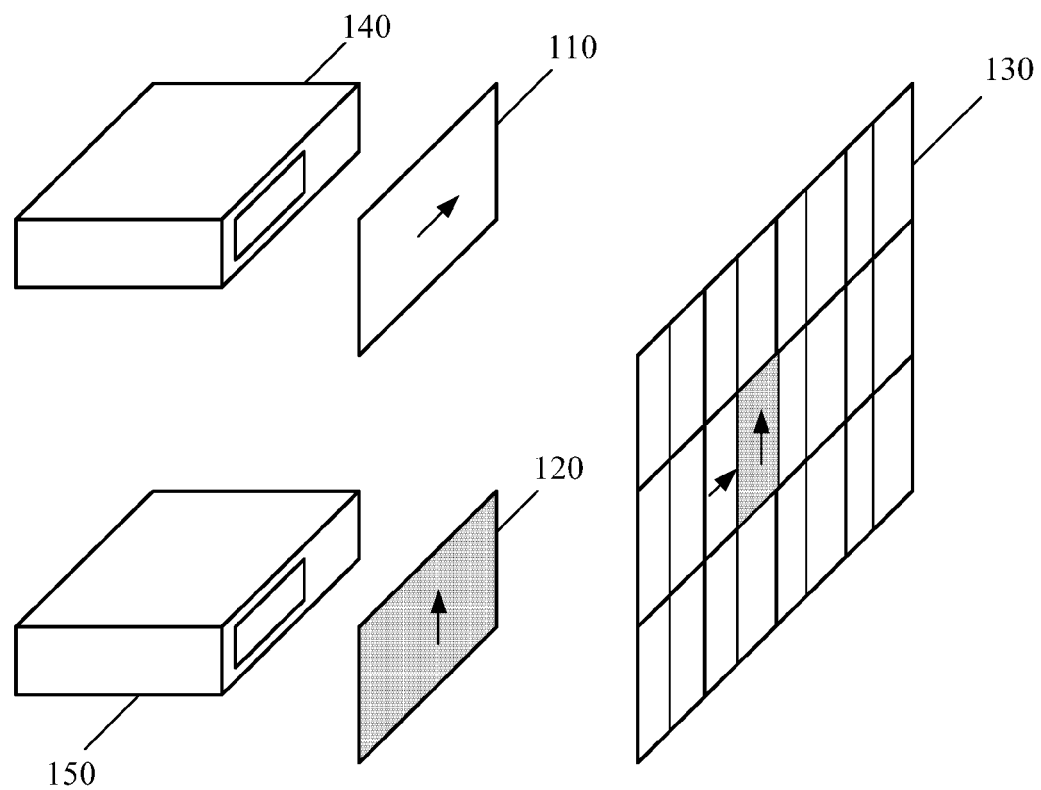
FIG. 1 is a schematic diagram of an imaging system according to an embodiment of the present invention.

FIG. 1 is a schematic diagram of an imaging system according to an embodiment of the present invention. The imaging system 100 in FIG. 1 includes:

a first polarization element 110 having a first polarization direction;

a second polarization element 120 having a second polarization direction;

a third polarization element 130, where a first area of the third polarization element 130 consists of a first semi-area and a second semi-area, where the first semi-area has the first polarization direction, and the second semi-area has the second polarization direction;

a first projection device 140, projecting a first image onto the first area by using the first polarization element; and a second projection device 150, projecting a second image onto the first area by using the second polarization element.

Specifically, the first area corresponds to a first pixel position, and the first projection device 140 projects the first image onto the first area by using the first polarization element, so as to present the first image in the first pixel position; and the second projection device 150 projects the second image onto the first area by using the second polarization element, so as to present the second image in the first pixel position.

It should be understood that the first image is acquired based on a first view for the first object, and the second image is acquired based on a second view for the first object, where the first view and the second view may be identical views, or may be different views. "Identical views" herein should be construed as multiple images that present content from a same viewing angle. Multiple images whose acquiring angles are the same and other parameters are different may also be identical views, for example, two images with a same acquiring viewing angle, and different resolution and other parameters. "Different views" herein should be construed as multiple images that present content from different viewing angles, and different views, such as a left view and a right view, respectively enter a left eye and a right eye of a viewer. The first polarization direction may be or may not be perpendicular to the second polarization direction.

It should be further understood that the third polarization element may include multiple first areas that are arranged horizontally or vertically, or may include multiple first areas and multiple second areas that are arranged alternately. A first semi-area of the second area has the first polarization direction, and a second semi-area of the second area has the second polarization direction, the second area corresponds to a second pixel position, and the first semi-area of the second area is adjacent to the first semi-area of the first area, or the second semi-area of the second area is adjacent to the second semi-area of the first area. In other words, the first area and the second area are of a symmetric structure.

Moreover, the first polarization element and the first projection device may be integrally formed as a polarization projection device. Alternatively, the second polarization element and the second projection device may be integrally formed as a polarization projection device.

The imaging system according to this embodiment of the present invention includes multiple polarization elements and projection devices, and because the projection devices can present in an area, corresponding to a pixel position, of a polarization element, images from two views, imaging resolution can be improved.

In addition, in a case in which two images that are projected onto a same area in multiple areas are from different views, an element such as polarized glasses, or a columnar lens, for separating different views may further be included to implement 3D imaging.

Figure 2:
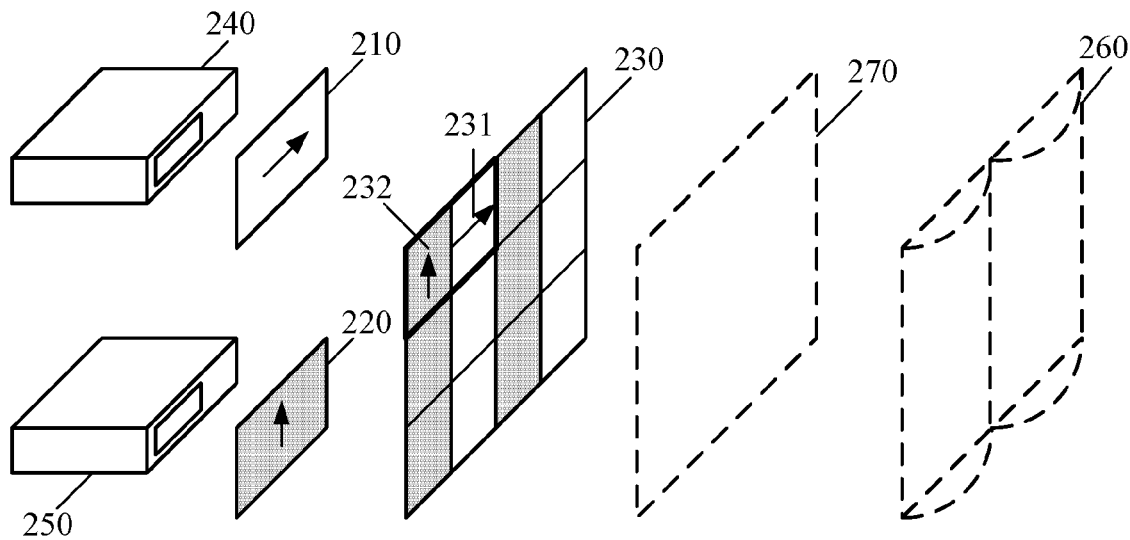
FIG. 2 is a schematic diagram of an imaging system according to another embodiment of the present invention.

FIG. 2 is a schematic diagram of an imaging system according to another embodiment of the present invention. The imaging system 200 in FIG. 2 includes: a first polarization element 210 having a first polarization direction; a second polarization element 220 having a second polarization direction; and a third polarization element 230, where a first area of the third polarization element consists of a first semi-area and a second semi-area, where the first semi-area of the first area has the first polarization direction, and the second semi-area of the first area has the second polarization direction. In this embodiment, a first image is acquired based on a first view for a first object, a second image is acquired based on a second view for the first object, and the first view is different from the second view.

A first projection device 240 projects the first image onto the first area by using the first polarization element; and a second projection device 250 projects the second image onto the first area by using the second polarization element.

An imaging system according to this embodiment of the present invention includes multiple polarization elements and projection devices, and because the projection devices can present in an area, corresponding to a pixel position, of a polarization element, images from two views, imaging resolution can be improved.

Specifically, the first area corresponds to a first pixel position, and images, such as a left view and a right view, that are presented in the first pixel position and are from different projection devices are acquired according to different views. In this embodiment, the imaging system 200 includes multiple first areas that are horizontally arranged and correspond to multiple first pixel positions. The first projection device 240 projects the first image onto the first area by using the first polarization element, so as to present the first image in the first pixel position; and the second projection device 250 projects the second image onto the first area by using the second polarization element, so as to present the second image in the first pixel position. Moreover, bold solid lines in the third polarization element in FIG. 2 show one area in multiple areas. Each area in the multiple areas consists of a first semi-area and a second semi-area, for example, a first semi-area 231 and a second semi-area 232 in FIG. 2. The first semi-area has the first polarization direction, and the second semi-area has the second polarization direction.

Further, each area in the multiple areas has a same imaging principle, and therefore, the one area shown by the bold solid lines in the third polarization element in FIG. 2 is only used as an example for description. After passing through the first polarization element 210, light, of a left view, from the first projection device has the first polarization direction, and is then projected onto the third polarization element. Because the semi-area 231 and the semi-area 232 have different polarization directions, on a viewing side, the left view can be seen only in the semi-area 232, and correspondingly, a right view can be seen only in the semi-area 231.

Figure 2A:
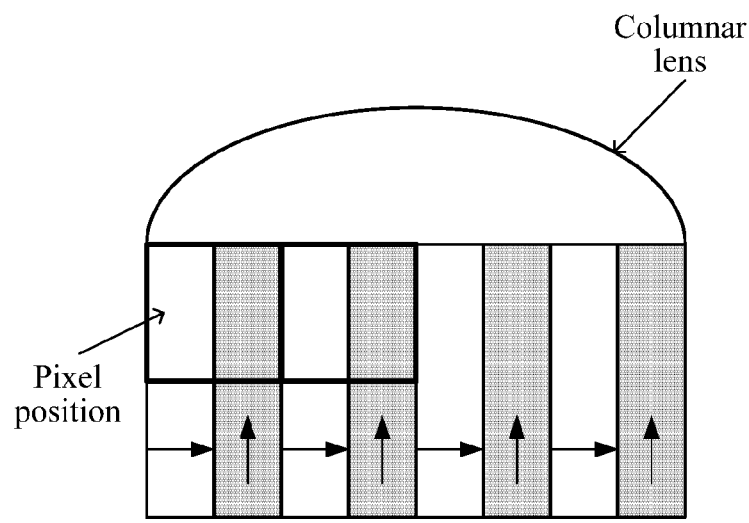
FIG. 2A is a schematic diagram of an imaging principle according to the another embodiment of the present invention.

It should be understood that, in this embodiment, that the first view is different from the second view may be that: an image projected by the first projection device is a left view, and an image projected by the second projection device is a right view, so that images ultimately presented by using the third polarization element are left and right views arranged alternately by using a semi-area as a unit; or may be that: an image projected by the first projection device has more views, for example, six views, or eight views, so as to implement a better 3D effect. The imaging principle is described below with reference to FIG. 2A by using eight views as an example. A figure located on an upper side in FIG. 2A shows a position relationship between multiple areas of the third polarization element and multiple pixel positions. A figure located at a lower side in FIG. 2A shows, for a column in a columnar lens, a situation in which eight views are projected onto the third polarization element. Specifically, the column in the columnar lens corresponds to four pixel positions, and for an image from the first projection device, view 1, view 3, view 5, and view 7 are sequentially projected onto four areas corresponding to the four pixel positions. Correspondingly, for an image from the second projection device, view 2, view 4, view 6, and view 8 are sequentially projected onto the four areas corresponding to the four pixel positions. Therefore, based on the foregoing principle, an image presented by using the third polarization element is "view 1" to "view 8" sequentially in each semi-area. In other words, adjacent semi-areas are used to project different views, and therefore, a viewer can view a more vivid 3D effect from various angles.

It should be further understood that the third polarization element 230 of the present invention may be an element that functions as the polarization element, such as a polarization grating, or may be a switchable liquid crystal that functions as a grating.

Moreover, the imaging system of this embodiment may further include polarized glasses, where two lenses of the polarized glasses respectively have the first polarization direction and the second polarization direction. Alternatively, the imaging system of this embodiment may include a columnar lens 260, and is used as a glasses-free 3D imaging system, where the third polarization element is disposed on a focal plane of the columnar lens 260, so that top views from different polarization directions converge in different directions after passing through the columnar lens.

Moreover, the imaging system of this embodiment may further include a scatter, which is disposed between the viewer and the third polarization element. For the imaging system including the columnar lens, the scatter is disposed between the columnar lens and the third polarization element.

Figure 3:
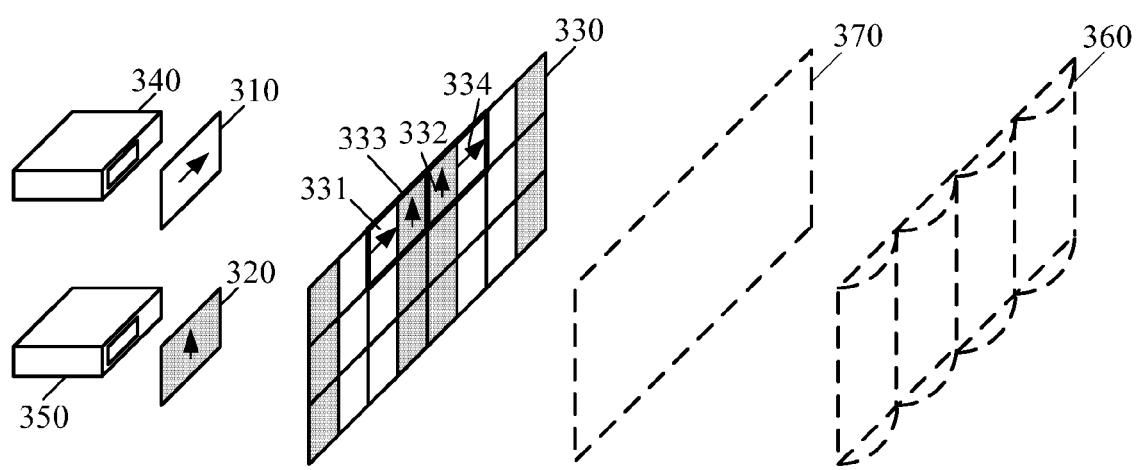
FIG. 3 is a schematic diagram of an imaging system according to another embodiment of the present invention.

FIG. 3 is a schematic diagram of an imaging system according to another embodiment of the present invention. An imaging system 300 in FIG. 3 includes: a first polarization element 310 having a first polarization direction; a second polarization element 320 having a second polarization direction; and a third polarization element 330, where a first area of the third polarization element consists of a first semi-area and a second semi-area, where the first semi-area of the first area has the first polarization direction, and the second semi-area of the first area has the second polarization direction. In this embodiment, a first image is acquired according to a first view of a first object, a second image is acquired according to a second view of the first object, the first view is different from the second view, and the second polarization element further includes a second area adjacent to a first area, where a first semi-area of the second area has the first polarization direction, and a second semi-area of the second area has the second polarization direction.

A first projection device 340 projects the first image onto the first area by using the first polarization element. The first projection device further projects a third image onto the second area by using the first polarization element, so as to present the third image in a second pixel position.

A second projection device 350 projects the second image onto the first area by using the second polarization element, so as to present the second image in a first pixel position, and the second projection device further projects a fourth image onto the second area by using the second polarization element. The third image is acquired based on a third view for a second object, and a fourth image is acquired according to a fourth view of the second object, where the third view is different from the fourth view.

Specifically, the first area corresponds to a first pixel position, and the second area corresponds to second pixel position. In this embodiment, the imaging system 300 includes multiple first areas and multiple second areas that are horizontally arranged alternately. Correspondingly, these areas correspond to multiple first pixel positions and multiple second pixel positions. For example, the first area and the second area are two adjacent areas in multiple areas shown by bold solid lines in the third polarization element in FIG. 2: a first area 333 and a second area 334. Each area in the multiple areas consists of a first semi-area and a second semi-area, for example, a first semi-area 331 and a second semi-area 332 in FIG. 3. The first semi-area has the first polarization direction, and the second semi-area has the second polarization direction. Moreover, the first projection device 340 projects the first image onto the first area by using the first polarization element, so as to present the first image in the first pixel position. The first projection device further projects the third image onto the second area by using the first polarization element, so as to present the third image in the second pixel position. The second projection device 350 projects the second image onto the first area by using the second polarization element, so as to present the second image in the first pixel position, and the second projection device further projects the fourth image onto the second area by using the second polarization element, so as to present the fourth image in the second pixel position. The third image is acquired according to the third view of the second object, and the fourth image is acquired according to the fourth view of the second object, where the third view is different from the fourth view.

The imaging system according to this embodiment of the present invention includes multiple polarization elements and projection devices, and because the projection devices can present in an area, corresponding to a pixel position, of a polarization element, images from two views, imaging resolution can be improved.

In this embodiment, an image projected by the first projection device onto the first area is from a left view, an image projected by the first projection device onto the second area is from a right view, an image projected by the second projection device onto the first area is from the right view, and an image projected by the first projection device onto the second area is from the left view. In other words, images from the first projection device are arranged alternately by using a pixel position as a basic unit and based on the left view and the right view. Similarly, images from the second projection device are arranged alternately by using a pixel position as a basic unit and based on the left view and the right view. A difference between the two images lies in that different views are projected by the first projection device and the second projection device onto a same area.

Figure 3A:
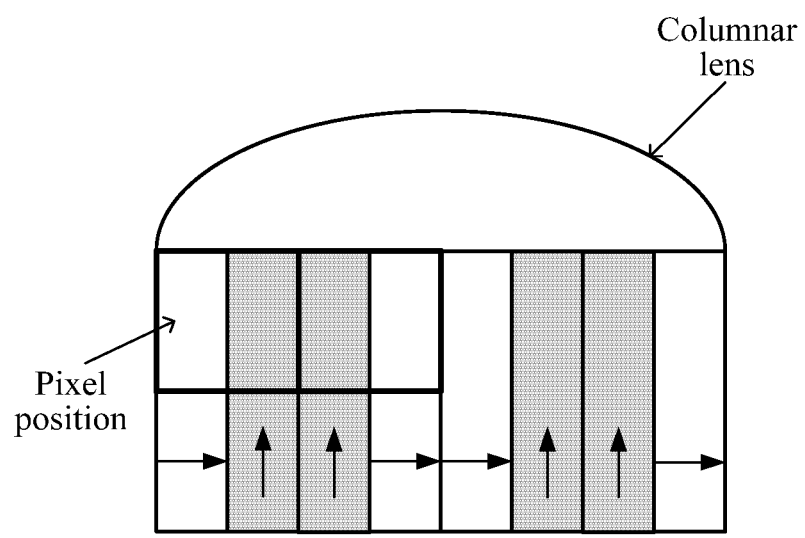
FIG. 3A is a schematic diagram of an imaging principle according to another embodiment of the present invention.
Figure 4:
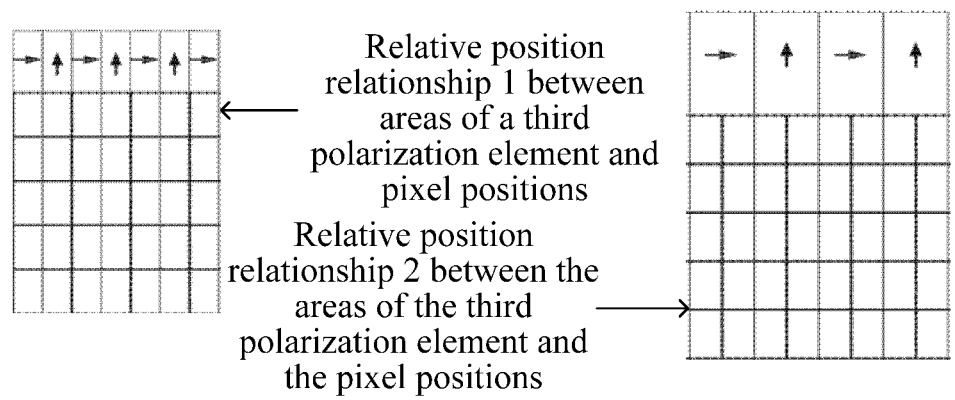
FIG. 4 is a schematic comparison diagram of a relative position relationship between multiple pixel positions and multiple areas of a third polarization element according to another embodiment of the present invention.

It should be understood that, in this embodiment, that two images projected onto a same area in multiple areas are from different views may be that: based on the foregoing imaging principle, an image projected by the first projection device is a left view, and an image projected by the second projection device is a right view, so that images ultimately presented by using the third polarization element are left and right views that are arranged alternately by using a semi-area as a unit; or may be that: an image projected by the first projection device has more views, for example, six views, or eight views, so as to implement a better 3D effect. Description is provided below with reference to FIG. 3A by using eight views as an example. A figure located on an upper side in FIG. 3A shows a position relationship between multiple areas of the third polarization element and multiple pixel positions. A figure located at a lower side in FIG. 3A shows, for a column in a columnar lens, a situation in which eight views are projected onto the third polarization element. Specifically, the column in the columnar lens corresponds to four pixel positions, and for an image from the first projection device, view 1, view 4, view 5, and view 8 are sequentially projected onto four areas corresponding to the four pixel positions. Correspondingly, for an image from the second projection device, view 2, view 3, view 6, and view 7 are sequentially projected onto the four areas corresponding to the four pixel positions. Therefore, based on the foregoing principle, an image presented by using the third polarization element in the embodiment of FIG. 3 is "view 1" to "view 8" sequentially in each semi-area. In other words, adjacent semi-areas are used to project different views, and therefore, a viewer can view a more vivid 3D effect from various angles. Moreover, FIG. 4 shows a schematic comparison diagram of a relative position relationship between multiple pixel positions and multiple areas of a third polarization element in the embodiment of FIG. 2 and the embodiment of FIG. 3.

For ease of understanding, in this embodiment, only the first area 333 and the second area 334 marked by two bold solid lines in the third polarization element 330 in FIG. 3 are used as an example for description. For example, for an image from the first projection device, a left view and a right view are respectively projected onto the first area 333 and the second area 334, under the action of the polarization element, on a viewing side, only the left view projected onto the first semi-area 331 of the first area 333 and the right view projected onto the first semi-area 331 of the second area 334 can be seen. Similarly, for an image from the first projection device, a right view and a left view are respectively projected onto the first area 333 and the second area 334, and therefore, on a viewing side, only the right view projected onto the second semi-area 332 of the first area 332 and the left view projected onto the second semi-area 332 of the second area 334 can be seen. Therefore, in the third polarization element, an effect of presenting a left view and a right view alternately by using a semi-area as a unit can be achieved.

It should be understood that, similar to the embodiment of FIG. 2, the third polarization element 330 of the present invention may be an element that functions as the polarization element, such as a polarization grating, or may be a switchable liquid crystal that functions as a grating. In addition, when a polarization grating is used as the third polarization element, a width of each grid in the grating used in a semi-area structure of this embodiment can be made double that in the embodiment of FIG. 2, thereby making it easier to fabricate a polarization grating.

Moreover, the imaging system of this embodiment may further include polarized glasses, where two lenses of the polarized glasses respectively have the first polarization direction and the second polarization direction. Alternatively, the imaging system of this embodiment may include a columnar lens 360, and is used as a glasses-free 3D imaging system, where the third polarization element is disposed on a focal plane of the columnar lens 360, so that top views from different polarization directions converge in different directions after passing through the columnar lens.

For the imaging system including the columnar lens, the scatter is disposed between the columnar lens and the third polarization element.

Figure 5:
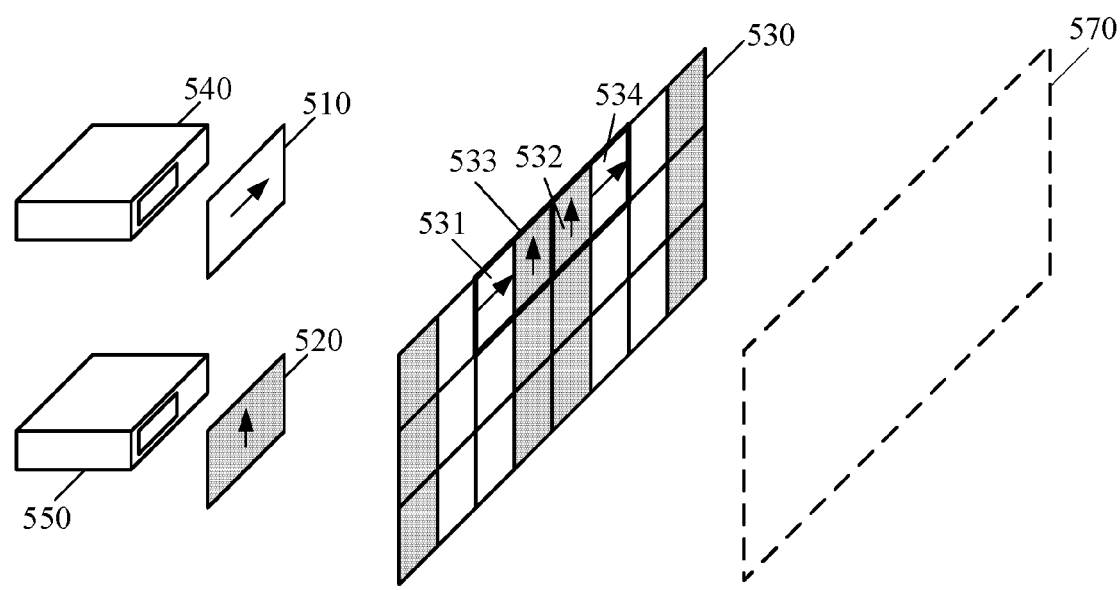
FIG. 5 is a schematic diagram of an imaging system according to another embodiment of the present invention.

FIG. 5 is a schematic diagram of an imaging system according to another embodiment of the present invention. An imaging system 500 in FIG. 5 includes: a first polarization element 510 having a first polarization direction; a second polarization element 520 having a second polarization direction; and a third polarization element 530, where a first area of the third polarization element consists of a first semi-area and a second semi-area, where the first semi-area of the first area has the first polarization direction, and the second semi-area of the first area has the second polarization direction. In this embodiment, a first image is acquired according to a first view of a third object, a second image is acquired according to a second view of the third object, and the first view is identical to the second view.

A first projection device 540 projects the first image onto the first area by using the first polarization element; and a second projection device 550 projects the second image onto the first area by using the second polarization element.

The imaging system according to this embodiment of the present invention includes multiple polarization elements and projection devices, and because the projection devices can present in an area, corresponding to a pixel position, of a polarization element, images from two views, imaging resolution can be improved.

Specifically, the first area corresponds to a first pixel position. The first projection device 540 projects the first image onto the first area by using the first polarization element, so as to present the first image in the first pixel position, and the second projection device 550 projects the second image onto the first area by using the second polarization element, so as to present the second image in the first pixel position.

In this embodiment, two images projected onto a same area in multiple areas are respectively from the first projection device 540 and the second projection device 550, and therefore, more image information can be presented. As an exemplary embodiment, by using a third polarization element, resolution of an ultimately presented image may be improved by twice.

It should be further understood that the third polarization element of this embodiment may be of a structure in the embodiment in FIG. 2, that is, the third polarization element includes multiple first areas; or the third polarization element of this embodiment may be of a structure in the embodiment of FIG. 3, that is, multiple areas of the third polarization element are first areas and second areas that are arranged alternately, where the first area and the second area are alternate with each other, a first semi-area of the second area is adjacent to the first semi-area of the first area, and a second semi-area of the second area is adjacent to the second semi-area of the second area.

Similarly, the third polarization element of this embodiment may be an element that functions as the polarization element, such as a polarization grating, or may be a switchable liquid crystal that functions as a grating.

Moreover, the imaging system of this embodiment may further include a scatter, where the third polarization element is disposed between the scatter and the first polarization element, or the third polarization element is disposed between the scatter and the second polarization element.

The foregoing descriptions are merely exemplary embodiments of the technical solutions of the present invention, but are not used to limit the protection scope of the present invention. Objects herein, such as "the first object", "the second object", and "the third object" may be a same object, or may be different objects. Any modification, equivalent replacement, and improvement made without departing from the principle of the present invention shall fall within the protection scope of the present invention.

What is claimed is:

1. An imaging system, comprising:
   a first polarization element having a first polarization direction;
   a second polarization element having a second polarization direction, wherein the second polarization direction is different from the first polarization direction;
   a third polarization element including:
      a first area that includes a first semi-area and a second semi-area, wherein the first semi-area of the first area has the first polarization direction, and the second semi-area of the first area has the second polarization direction,
      a second area that includes a first semi-area and a second semi-area, wherein the first semi-area of the second area has the first polarization direction, and the second semi-area of the second area has the second polarization direction, and
      a third area that includes a first semi-area and a second semi-area, wherein the first semi-area of the third area has the first polarization direction, and the second semi-area of the third area has the second polarization direction;
   a first projection device that projects, by using the first polarization element, a first image onto the first area, a third image onto the second area, and a fifth image onto the third area;
   a second projection device that projects, by using the second polarization element, a second image onto the first area, a fourth image onto the second area, and a sixth image onto the third area,
   wherein the second area of the third polarization element is adjacent to the first area of the third polarization element in a first direction, such that the first semi-area of the first area is adjacent to the first semi-area of the second area, and the second semi-area of the first area is adjacent to the second semi-area of the second area, and
   wherein the third area of the third polarization element is adjacent to the first area of the third polarization element in a second direction perpendicular to the first direction, such that the second semi-area of the third area is adjacent to the second semi-area of the first area.

2. The system according to claim 1, wherein:
   the first image is based on a first view of a first object,
   the second image is based on a second view of the first object, and
   the first view of the first object is different from the second view of the first object.

3. The system according to claim 2, wherein:
the third image is based on a third view of a second object, and
the fourth image is based on a fourth view of the second object, and the third view of the second object is different from the fourth view of the second object.

4. The system according to claim 1, further comprising:
a columnar lens layer, wherein the third polarization element is disposed between the columnar lens layer and the first polarization element.

5. The system according to claim 1, wherein:
the first image is based on a first view of a third object,
the second image is based on a second view of the third object, and
the first view of the third object is identical to the second view of the third object.

6. The system according to claim 1, wherein the first polarization direction is perpendicular to the second polarization direction.

7. The system according to claim 1, wherein the third polarization element is a polarization grating.

8. The system according to claim 1, wherein the third polarization element is a switchable liquid crystal.

9. The system according to claim 1, further comprising:
a scatter, wherein the third polarization element is disposed between the scatter and the first polarization element.

10. The system according to claim 1, further comprising:
a columnar lens layer, wherein the third polarization element is disposed between the columnar lens layer and the second polarization element.

11. The system according to claim 1, further comprising:
a scatter, wherein the third polarization element is disposed between the scatter and the second polarization element.

* * * * *